July 7, 1942.  E. T. TURNER  2,288,962
FEED WATER HEATER AND INJECTOR
Filed Jan. 30, 1939  2 Sheets-Sheet 1
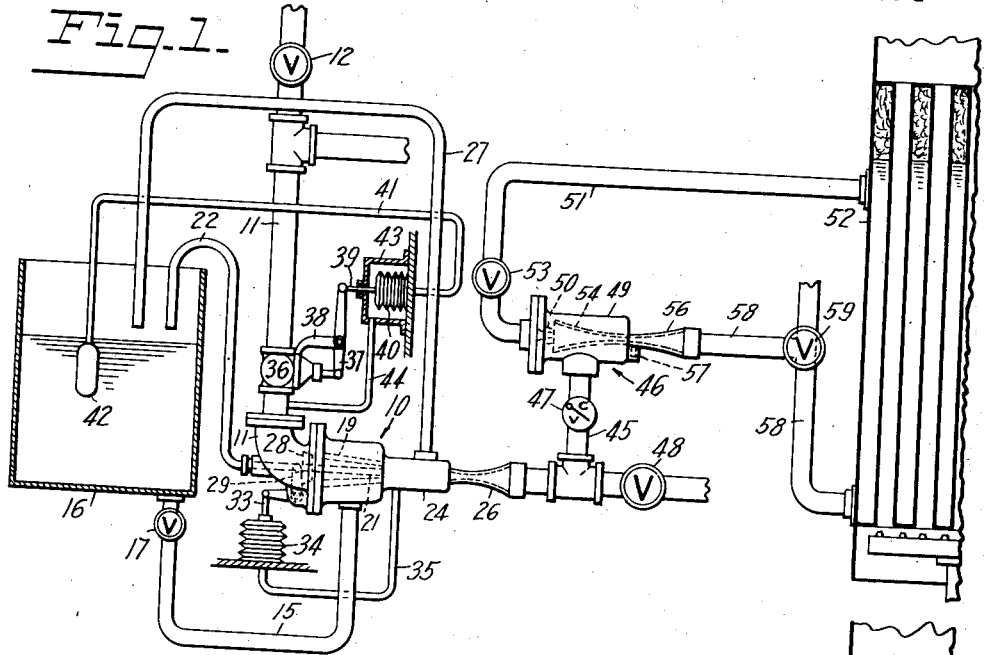
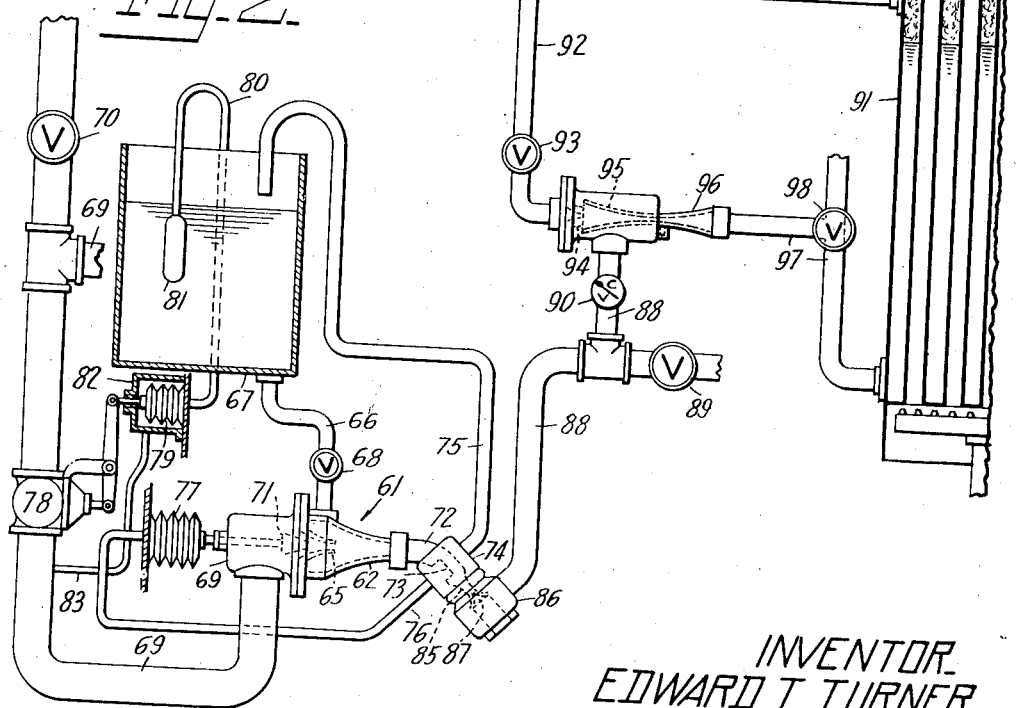
INVENTOR
EDWARD T. TURNER
by
his ATTORNEY July 7, 1942.  E. T. TURNER  2,288,962
FEED WATER HEATER AND INJECTOR
Filed Jan. 30, 1939  2 Sheets—Sheet 2
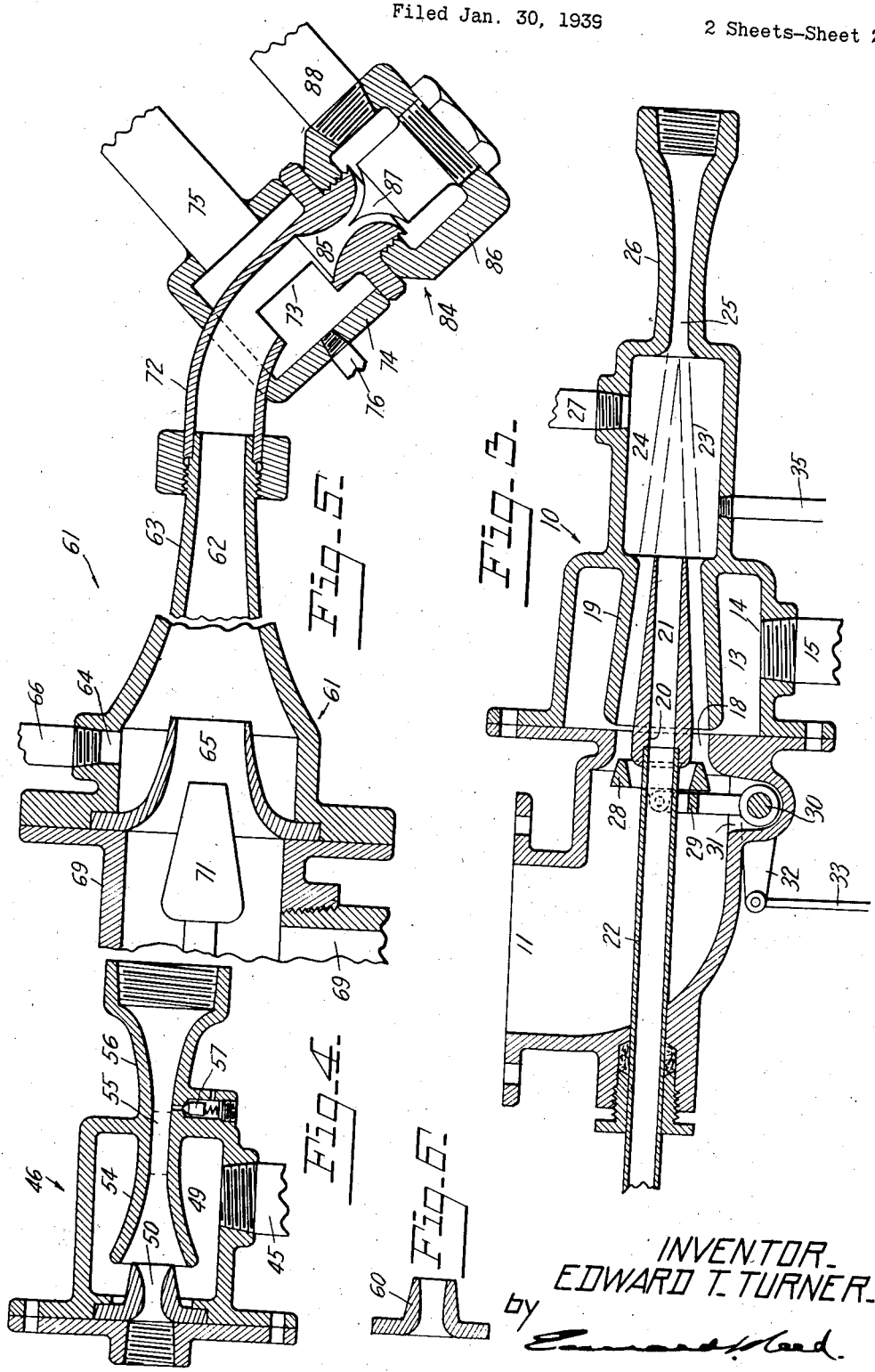
INVENTOR
EDWARD T. TURNER
by
his ATTORNEY Patented July 7, 1942

2,288,962

UNITED STATES PATENT OFFICE 2,288,962

FEED WATER HEATER AND INJECTOR

Edward T. Turner, Dayton, Ohio

Application January 30, 1939, Serial No. 253,475

9 Claims. (Cl. 103—265)

This invention relates to a method and apparatus for preheating feed water and injecting the same into a boiler.

The main object of the invention is to provide a two stage injector system in which low pressure exhaust steam may be better utilized to preheat the feed water.

A further object of the invention is to provide such a system in which lower exhaust steam pressures may be used than is possible with injector systems as heretofore used.

A further object of the invention is to provide an injector system which will permit of large variations in the rate of feed of the water and an easy regulation thereof.

A further object of the invention is to provide an apparatus of this kind with means for separating uncondensed steam from a mixture of steam and water at high velocity without impairing the velocity energy of the water.

A further object of the invention is to provide means whereby the supply of steam to the injector may be automatically regulated in accordance with the amount of uncondensed steam separated from the mixture of steam and water.

A further object of the invention is to provide means whereby the pressure of the steam supplied to the injector may be regulated in accordance with the initial temperature of the feed water.

Other objects of the invention may appear as the method and apparatus are described in detail.

In the accompanying drawings Fig. 1 is a side elevation, partly in section, of an apparatus embodying my invention; Fig. 2 is a similar view of a slightly modified form of the apparatus; Fig. 3 is a sectional view of the primary injector of Fig. 1; Fig. 4 is a sectional view of the secondary injector of Fig. 1; Fig. 5 is a sectional view of the primary injector of Fig. 2; and Fig. 6 is a detail view of the inlet orifice forming a part of the secondary injector of Fig. 2.

In carrying out my invention low pressure steam is utilized to first increase the pressure of the feed water to a pressure substantially in excess of the pressure of the steam, and which may be referred to as the "primary pressure," and at the same time to heat the water to approximately the temperature of the steam, which may be referred to as the "primary temperature." The water at this primary temperature and primary pressure is then passed through a secondary stage of operation in which its pressure is further increased to enable it to be injected into the boiler.

In the first stage operation the low pressure steam, such as exhaust steam from a noncondensing power unit, is expanded to a lower pressure and its pressure energy thus converted into velocity energy. This steam at high velocity is then intimately mixed with the relatively cool feed water, thereby imparting a high velocity to the water and the consequent momentum of the steam and water substantially equals the momentum of the high velocity steam. All or a substantial portion of the steam will be condensed in the relatively cool water and the water thus heated to substantially the initial temperature of the steam, that is, approximately 212° F. Such uncondensed steam as remains in the mixture is then separated from the water and the velocity energy of the high velocity water is then converted into pressure energy, thus raising the pressure of the water to its primary pressure, which is substantially above the initial pressure of the steam and is therefore substantially above the pressure at which it will vaporize at its then primary temperature.

The feed water at this primary pressure and primary temperature is then passed to the secondary stage of operation and in this secondary stage I may use either live steam or water at boiler temperature and boiler pressure as the propellant. When boiler water is used it is passed from a high pressure to a lower pressure to convert or "flash" a portion thereof into steam which is expanded in and about the water to impart velocity energy to the mixture. This mixture of the boiler water and steam at high velocity is then mixed with the feed water at primary temperature and primary pressure, thereby imparting to the final mixture a high velocity, the momentum of the mixture being approximately equal to the momentum of the mixture of the boiler water and steam. The primary temperature of the feed water being substantially below the temperature of vaporization at primary pressure it follows that the steam in the final mixture will be condensed and its heat imparted to the feed water. The velocity energy of this final mixture, which is now solid liquid, is then converted into pressure energy and the pressure thereof is raised to or above boiler pressure, thus enabling the mixture to enter the boiler.

When live steam is used as a propellant in the second stage operation it is expanded to a lower pressure to convert heat and pressure energy thereof into velocity energy and at this high velocity is mixed with the feed water at primary pressure and primary temperature, thus imparting velocity energy to the mixture which is subsequently converted into pressure energy.

In the present application I have illustrated two forms of an apparatus for performing the foregoing method, one of which is designed primarily for the use of boiler water and the other of which is designed primarily for the use of boiler steam, but either of which may, with minor modifications, be used with either boiler water or boiler steam. In each instance the apparatus comprises a primary injector in which the exhaust steam is used to impart primary pressure and primary temperature to the feed water and a secondary injector in which boiler water or live steam is used as the propellant to increase the pressure of the feed water and inject the same into the boiler.

That form of the apparatus shown in Figs. 1, 3 and 4, comprises a primary injector, indicated as a whole by the reference numeral 10, and this injector is connected by a conduit 11 with a suitable source of supply of exhaust steam, not here shown. The steam conduit 11 is preferably provided with a relief valve 12. This primary injector 10 is shaped to provide the same with an inlet chamber 13 having a water inlet 14, adapted to be connected with a suitable source of supply of feed water. In the present arrangement this water inlet is connected by a pipe 15 with a water reservoir 16 and is provided with a valve 17 to regulate the flow of water from the reservoir to the injector. As here shown, the water flows by gravity from the reservoir to the injector but obviously any suitable means may be utilized for supplying the feed water to the injector. The inlet chamber 13 is provided at its rear end with an orifice 18 with which the steam conduit 11 is connected. Arranged within the inlet chamber 13 is a forwardly tapered passageway, or combining tube, here shown as a forwardly tapered nozzle 19 supported at its forward end by the front wall of the inlet chamber, through which the passageway extends. The larger or rear end of the passageway or tube 19 is of a diameter approximately equal to the diameter of the orifice 18 and is arranged in line with that orifice. This rear end of the passageway or tube lies adjacent to the orifice 18 but is spaced from the rear wall of the chamber a distance sufficient to permit the free flow of water from the inlet chamber into the pasageway. The orifice 18 of the inlet chamber is so shaped that as the exhaust steam passes through the same it will be expanded to a lower pressure and a substantial portion of the heat and pressure energies thereof will be converted into velocity energy, and the steam at this high velocity will be delivered to the passageway or combining tube 19 where it will mix with the water and will impart high velocity to the latter, the momentum of the steam and water substantially equalling the momentum of the high velocity steam. The feed water being at a relatively low temperature the steam which is mixed therewith, or a substantial portion thereof, will be condensed and the heat of the condensed steam will be transferred to the feed water, thus heating the latter to a temperature substantially equal to the temperature of the exhaust steam.

In order to insure the proper heating of the feed water I prefer to mix therewith a quantity of steam in excess of the quantity which will be condensed by the water in the passageway or combining tube and to thereafter separate the uncondensed steam from the water. It is important that this surplus uncondensed steam should be separated from the water without impairing the velocity energy of the latter and in the present arrangement this is accomplished by discharging the mixture of steam and water in the form of a tapered jet from which the steam will be squeezed by the convergence of the jet. In the present arrangement there is mounted in the tapered passageway or combining tube 19 a tapered spreader 20 which is spaced from the wall of the passageway or tube so as to provide between the spreader and the tube on annular passageway through which the steam and water pass and in which they are intimately mixed. Preferably the spreader is provided with a longitudinal conduit 21 which leads through a pipe 22 to the exterior of the injector, the pipe serving as a support for the spreader. Due to this arrangement the mixture of water and steam is discharged from the passageway in the form of a tapered or cone-shaped jet 23 which is hollow for the greater portion of its length. This tapered jet passes through a separating chamber 24 formed in the injector beyond and in line with the discharge end of the passageway 19, and the apex of the jet enters the inlet 25 of a compression nozzle 26 arranged at that end of the separating chamber opposite the passageway 19. The separating chamber is of an interior diameter somewhat larger than the discharge end of the passageway 19 so that the walls thereof are spaced from the tapered jet. During its passage through the separating chamber the mixture of steam and water is rendered more compact, due to the converging shape of the jet, and the uncondensed steam is squeezed out of the water and escapes both from the outer surface and the inner surface of the jet. The steam which escapes from the outer surface of the jet is exhausted through an exhaust pipe 27 and the steam which escapes from the inner surface of the jet is exhausted through the longitudinal bore 21 of the spreader 20 and through the pipe 22 to the exterior of the injector. Inasmuch as more or less water will be carried along with the steam which is exhausted from the separating chamber and it is desirable to recover that water I have here shown the pipes 22 and 27 as discharging into the supply reservoir 16. The feed water, which is now free from uncondensed steam, is discharged from the separating chamber through the compression nozzle 26 which serves to convert into pressure energy all the velocity energy of the water excepting only that portion thereof which is lost due to friction, and the water is thereby raised to its primary pressure, which, as heretofore stated, is substantially higher than the initial pressure of the steam. The primary temperature of the water, which has been imparted thereto by the steam, is substantially below the temperature of vaporization at this primary pressure. The primary pressure of the feed water may be determined with substantial accuracy and maintained substantially constant by properly proportioning the quantities of exhaust steam and feed water which are delivered to the injector.

To prevent undesirable fluctuations in the rate of feed of the water to the primary injector it is desirable to maintain substantially constant pressure in the passageway or combining tube 19 and for this purpose the supply of steam to the injector may be regulated in accordance with the quantity of uncondensed steam which is separated from the mixture of steam and water in the separating chamber. In the construction illustrated the steam conduit 11 is provided with a regulating valve 28 adjacent the inlet end of the orifice 18, this valve being here shown as annular in form and adapted to enter the space between the wall of the orifice and the spreader 20. As shown the valve is pivotally mounted at one end of an arm 29 secured at its other end to a shaft 30 mounted in a recess 31 in the wall of the conduit 11. A rock arm 32 secured to the shaft 20 is connected by a rod 33 with a pressure operated device or bellows 34 which in turn is connected by a tube 35 with the separating chamber. Thus if the quantity of steam becomes excessive in proportion to the quantity of water in the mixture passing through the combining tube 19 the relatively large amount of uncondensed steam which is separated from the mixture will accumulate in the separating chamber and create therein a pressure which will act through the tube 35 on the bellows 34 and move the regulating tube 38 toward its closed position to reduce the supply of steam to the injector.

In some installations, such as on locomotives, there may be a substantial variation in the temperature of the feed water and the higher the temperature of the feed water the smaller the quantity of steam which will be condensed by that water. Uunder such circumstances there may be an excessive amount of uncondensed steam separated from the mixture in the separating chamber, although the proportions of steam and water by weight remain substantially the same. This may result in the valve 28 being adjusted to cut down the supply of steam to such an extent that the velocity energy thereof will not be sufficient to impart the desired velocity to the water. I have therefore provided means whereby the pressure of the steam at the inlet orifice 18 is controlled in accordance with the initial temperature of the feed water so that the pressure at said orifice will increase as the temperature of the water rises, thereby imparting an increased velocity to the steam at the time it is mixed with the water. For this purpose a regulating valve 36 is interposed in the exhaust steam conduit 11 at a point in advance of the valve 28. The valve 36 is operatively connected with one end of a lever 37 which is pivotally mounted between its ends on a bracket 38 and the other end of which is connected by a rod 39 with a pressure operated device or bellows 40, which bellows is connected by a tube 41 with a bulb 42 which is immersed in the feed water at a point in advance of the injector, in the present instance, in the reservoir 16. The bulb 42, tube 41 and bellows 40 are filled with a volatile fluid which will expand under the influence of heat in the feed water and thus expand the bellows and actuate the lever 37 to open the valve 36. The bellows 40 is enclosed in a tight casing 43 which is connected by a tube 44 with the conduit 11 between the valve 36 and the valve 28. Thus the bellows is subjected to an internal pressure determined by the temperature of the feed water and to an internal pressure determined by the pressure in the conduit 11 between the two valves. This latter pressure, together with the spring action of the resilient bellows, tends to move the valve 36 toward its closed position, the position of the valve being determined by the relative internal and external pressures on the bellows, and as the internal pressure increases in proportion to the increase of the heat in the feed water the valve will be further opened to permit the passage of a larger quantity of steam and thus increase the pressure of the steam at the inlet orifice.

The feed water at primary pressure and primary temperature is discharged from the compression nozzle 26 through a pipe 45 to a secondary injector, indicated as a whole by the reference numeral 46, the pipe 45 being provided with a check valve 47 to prevent the reverse flow of the water, and with a relief valve 48 to permit the discharge of air when the operation of the apparatus is initiated. The secondary injector comprises a chamber 49 with which the pipe 45 is connected and this chamber is provided at one end thereof with an inlet orifice 50 which is connected by a pipe 51 with the boiler 52 at a point below the normal level of the water in the boiler, so that water under boiler pressure is delivered through the pipe 51 to the orifice 50 of the injector, the pipe 51 being provided with a valve 53 to regulate the flow of water through the same. The orifice 50 is here shown in the form of a nozzle so shaped as to provide a pressure drop in the water passing through the same which will convert, or "flash," a portion of the highly heated water into steam and in which this steam will mix with and expand in and about the water and impart velocity energy to the mixture of steam and water. The secondary injector also comprises a tapered nozzle or combining tube 54 having its larger or inlet portion arranged adjacent to and in a line with the nozzle or orifice 50. The combining tube 54 is connected by a constricted portion or throat 55 with a compression nozzle 56, the throat 55 being provided with the usual relief valve 57. The combining tube 54 is in open communication with the interior of the chamber 49 to receive feed water therefrom and as the mixture of steam and boiler water at high velocity enters the inlet end of the combining tube 54 this mixture is mixed with and will impart velocity energy to the feed water which enters the combining tube in the chamber 49. The primary temperature of the feed water being substantially below its temperature of vaporization at primary pressure it follows that the steam which is mixed with the feed water will be condensed thereby and will further heat the same and the mixture of feed water and boiler water will be discharged through the throat 55 at high velocity to the compression nozzle 56 wherein its velocity energy will be converted into pressure energy and the pressure of the mixture increased to or above boiler pressure, thus enabling the mixture to be discharged from the secondary injector through a conduit 58 into the boiler, the conduit 58 being preferably provided with a relief valve 59.

As has been heretofore stated either boiler water or boiler steam may be utilized as the propellant to impart this final pressure to the feed water and when steam is so used an expansion nozzle, such as shown at 60 in Fig. 6, is substituted for the nozzle 50 of the secondary injector and steam under pressure passing through this nozzle is expanded to a lower pressure and the heat and pressure energies thereof thus converted into velocity energy, so that the steam at high velocity will enter the inlet end of the combining tube 54 and will be condensed by the feed water which is there mixed with it and the velocity energy thus imparted to the feed water will be converted into pressure energy to inject the feed water into the boiler. It is important that all the steam which is mixed with the feed water in the combining tube 54 shall be condensed and this may be accomplished by the proper regulation of the respective regulating valves.

In Figs. 2, 5 and 6, there is shown a modified form of apparatus embodying a different type of primary injector and showing the secondary injector as operated by steam from the boiler. As there shown the primary injector 61 comprises a forwardly tapered structure which forms within itself a chamber 62 the forward portion of which constitutes a tapered passageway or combining tube 63. This chamber is provided near its rear end with a water inlet 64 and in its rear wall with a steam orifice 65. The water inlet is connected by a supply pipe 66 with the reservoir 67 and this pipe is provided with a regulating valve 68. The orifice 65 is connected with a source of exhaust steam by a conduit 69 having a relief valve 70 and a regulating valve 71. The orifice is here shown as a relatively short expansion nozzle which extends into the larger end portion of the chamber 61 and is so shaped that the steam passing through the same will be expanded to a lower pressure and a substantial portion of the heat and pressure energies thereof converted into velocity energy. As the steam at this high velocity is discharged from the expansion nozzle 65 into the combining tube 63 it mixes with the feed water therein and imparts velocity energy to that water. The feed water being at a relatively low temperature prior to the mixing with the steam will cause all or a substantial portion of the steam to be condensed and the heat thereof transferred to the water, thus heating the water to a relatively high temperature.

As stated in connection with the first form of the apparatus I prefer to supply steam to this primary injector in a quantity in excess of that which will be condensed by the feed water and to thereafter separate the uncondensed steam from the feed water. In this second form of primary injector I employ a centrifugal separator for removing the uncondensed steam from the feed water and, as here shown, this separator comprises an arcuate conduit 72 which is connected with the discharge end of the combining tube 63 and is provided in the inner wall thereof, that is the wall having the shorter radius, with an opening 73. A casing 74 is mounted about and spaced from the conduit 72 and encloses the opening 73. As the mixture of steam and water at high velocity passes through the arcuate conduit centrifugal force will cause the water, due to its greater specific gravity, to follow the outer or longer surface of the conduit while the steam, due to its lower specific gravity, will tend to follow the inner or shorter surface of the conduit and will escape through the opening 73 into the casing 74 from which it will be discharged through an exhaust conduit 75.

The valve 71 which regulates the supply of steam to the injector is controlled in accordance with the amount of uncondensed steam separated from the mixture and to this end the casing 74 is connected by a tube 76 with a pressure operated device or bellows 77 which in turn is connected with the valve 71, the operation being substantially the same as that above described. In this device the steam pressure at the orifice 65 is controlled in accordance with the initial temperature of the feed water in substantially the manner above described. For this purpose the steam conduit 69 is provided with a valve 78 which is actuated by a bellows 79 which is connected by a tube 80 with a bulb 81 in the feed water reservoir, the bellows 79 being enclosed by a casing 82 connected by a tube 83 with the conduit 69 between the valves 78 and 71.

The feed water from which the uncondensed steam has been removed is discharged from the separating conduit 72 through a compression nozzle, indicated as a whole by the reference numeral 84, which serves to convert the velocity energy of the water into pressure energy. In the arrangement here shown this compression nozzle comprises a longitudinal passageway 85 having a constricted intermediate portion and having its end portions flared in opposite directions, the inner flared end of the nozzle being in open communication with the separating conduit 72 beyond the opening 73. Surrounding the outer flared end of the nozzle is a casing 86 in which is supported a substantially conical member 87 which projects into the outer end of the pasageway 85 and is so shaped and arranged that its conical surface will be at all points spaced substantially the same distance from the flared wall of the passageway 85, thereby providing an annular passageway which gradually increases in overall diameter and which permits a large conversion of velocity energy into pressure energy during the relatively short movement of the water. The water is discharged from this compression nozzle at a relatively high primary pressure and at a primary temperature substantially below the temperature of vaporization at the primary pressure and is delivered from the casing 86 through a conduit 88 to a secondary injector indicated as a whole by the reference numeral 89a. The conduit 88 is preferably provided with a relief valve 89, to permit air to be exhausted from the system when initiating the operation thereof, and with a check valve 90.

The secondary injector is connected with the steam space in the boiler 91 by a pipe 92 having a regulationg valve 93. The construction of the secondary injector is substantially similar to the injector shown in Fig. 4 but it is provided with a steam expansion nozzle 94 of the type shown at 60 in Fig. 6 in lieu of the nozzle 59 shown in Fig. 4. As explained in connection with the operation of the apparatus of Fig. 1 when live steam is used, the steam under boiler pressure passing through the expansion nozzle 94 is expanded to a lower pressure and substantial portions of its heat and pressure energies are converted into velocity energy. This steam at high velocity is directed into the inner end of a combining tube 95 where it is mixed with feed water from the primary injector at primary pressure and primary temperature. The primary temperature of the feed water being below the temperature of vaporization at primary pressure the boiler steam entering the compression nozzle will be condensed, its heat transferred to the feed water and the feed water discharged at high velocity through the compression nozzle 96 where the velocity energy of the water is converted into pressure energy and the water is then delivered through a pipe 97 to the boiler at a pressure sufficiently high to enable the same to enter the boiler. The pipe 97 is also preferably provided with a relief valve 98.

While I have shown and described the preferred method of carrying out my invention and have illustrated two forms of apparatus by means of which the method may be performed I wish it to be understood that I do not desire to be limited to the details thereof as various modifications may occur to a person skilled in the art.

Having now fully described my invention, what I claim as new and desire to secure by Letters Patent, is:

1. In an apparatus for preheating feed water and injecting the same into a boiler, an injector, separate means for delivering feed water and exhaust steam to said injector, said injector having means for utilizing said steam to impart to said water a pressure substantially greater than the initial pressure of said steam and a temperature approximating the initial temperature of said steam and substantially below the temperature of vaporization of said water at the aforesaid pressure, a second injector connected with the first mentioned injector to receive therefrom said water at said pressure and temperature, and means for delivering to said second injector water from said boiler at boiler pressure and temperature, said second injector having means for converting a portion of said boiler water into steam, expanding said steam to impart velocity energy to said boiler water and for mixing said boiler water and steam with said feed water to impart velocity energy to the latter and to condense said steam, and also having means to convert the velocity energy of said feed water into pressure energy and to utilize said pressure energy to inject said feed water into said boiler.

2. In an apparatus of the character described, a separating chamber, an annular tapered passageway communicating with one end of said chamber, a compression nozzle communicating with the other end of said chamber, means for supplying liquid to said passageway, means for converting heat and pressure energies of steam into velocity energy and mixing said steam at high velocity with liquid in said passageway to impart velocity energy to said liquid and discharge the same through said chamber to said compression nozzle in the form of a hollow tapered jet spaced throughout its length from the surrounding wall of said chamber and from the inner and outer surfaces of which the uncondensed steam will separate, and means for exhausting the separated steam from said chamber and from the interior of said hollow jet.

3. In an apparatus of the character described, a structure having an inlet chamber provided with a liquid inlet and an orifice for the admission of steam, a forwardly tapered passageway in said chamber having its larger end in line with said orifice and in open communication with said chamber, a forwardly tapered spreader arranged in and spaced from the walls of said passageway and having a longitudinal conduit leading to the exterior of said structure, a separating chamber beyond said inlet chamber in open communication with the smaller end of said passageway and having an outlet for steam, and a compression nozzle having its inlet in open communication with said separating chamber and substantially in axial alinement with said passageway.

4. In an apparatus of the character described, a structure having an inlet chamber provided with a liquid inlet and an orifice for the admission of steam, a forwardly tapered passageway in said chamber having its larger end in line with said orifice and in open communication with said chamber, a separating chamber beyond said inlet chamber and in open communication with the smaller end of said passageway and having an outlet for steam, a compression nozzle having its inlet and in open communication with said separating chamber in substantially axial alinement with said passageway, a steam conduit leading to said orifice, a valve in said conduit, and means for actuating said valve in accordance with the temperature of the water in advance of said liquid inlet.

5. In an apparatus of the character described, a structure having an inlet chamber provided with a liquid inlet and an orifice for the admission of steam, a forwardly tapered passageway in said chamber having its larger end in line with said orifice and in open communication with said chamber, a separating chamber beyond said inlet chamber and in open communication with the smaller end of said passageway and having an outlet for steam, a compression nozzle having its inlet end in open communication with said separating chamber in substantially axial alinement with said passageway, a steam conduit leading to said orifice, a valve in said conduit to control the passage of steam through said orifice, means controlled by the pressure of separated steam in said separating chamber to actuate said valve, a second valve in said conduit to control the pressure of steam at said orifice, and means controlled jointly by the temperature of the liquid in advance of said liquid inlet and by the pressure in said conduit between said valves to actuate said second valve.

6. In an apparatus of the character described, an injector provided with a forwardly tapered chamber having near its larger end an inlet for liquid, a relatively short expansion nozzle extending into the larger end of said chamber, a conduit curved about a transverse axis, connected with the smaller end of said chamber and having an opening in the inner wall thereof, a casing extending about said conduit in spaced relation thereto enclosing said opening and having an outlet, and a compression nozzle connected with said conduit beyond said opening.

7. In an apparatus for heating feed water and introducing the same into a boiler, means for expanding steam from a higher pressure to a lower pressure to convert heat and pressure energies thereof into velocity energy, means for mixing said steam at high velocity with feed water to heat said water to approximately the temperature of said steam and to impart velocity energy to said mixture of water and steam, means for converting the velocity energy of said water into pressure energy, means controlled by the initial temperature of said feed water to regulate the pressure of the steam supplied to said expanding means, and means for mixing with said water at said high pressure a fluid at high temperature and high velocity, converting velocity energy of the mixture of fluid and water into pressure energy and utilizing said pressure energy to introduce said mixture into said boiler.

8. In an apparatus of the character described, means for expanding steam from a higher pressure to a lower pressure to convert the heat and pressure energies thereof into velocity energy, means for mixing with water a quantity of said steam at high velocity in excess of the quantity which will be condensed by said water to heat said water to approximately the temperature of said steam and to impart velocity energy to the mixture of steam and water, means for separating uncondensed steam from said water, means controlled by the pressure of the separated steam to regulate the quantity of steam which is mixed with said water, means controlled by the initial temperature of said water for controlling the pressure of said steam at its point of expansion, and means for converting the velocity energy of said water into pressure energy.

9. In an apparatus for heating feed water and introducing the same into a boiler, means for expanding steam from a higher pressure to a lower pressure to convert heat and pressure energies thereof into velocity energy, means for mixing said steam at high velocity with feed water to condense a portion of said steam and heat said water substantially to its temperature of vaporization at atmospheric pressure and to impart velocity energy to the mixture of steam and water, means for removing uncondensed steam from said water, means for converting velocity energy of said water into pressure energy to impart to said water a pressure higher than the pressure at which it will vaporize at the temperature imparted thereto by said steam, means for passing highly heated propellant water from a higher pressure to a lower pressure to convert a portion of said propellant water into steam and for expanding said steam in and about said propellant water to impart velocity energy to the latter, means for mixing said propellant water and steam with said feed water under pressure to condense said steam and impart velocity energy to said feed water, and means for converting the velocity energy of the mixture into pressure energy and utilizing said pressure energy to introduce said mixture into said boiler.

EDWARD T. TURNER.